Oct. 16, 1962 M. J. PURETIC 3,058,247
BRAILER APPARATUS
Filed Sept. 19, 1960 4 Sheets-Sheet 1

INVENTOR.
MARIO J. PURETIC
BY FULWIDER, MATTINGLY
& HUNTLEY
ATTORNEYS

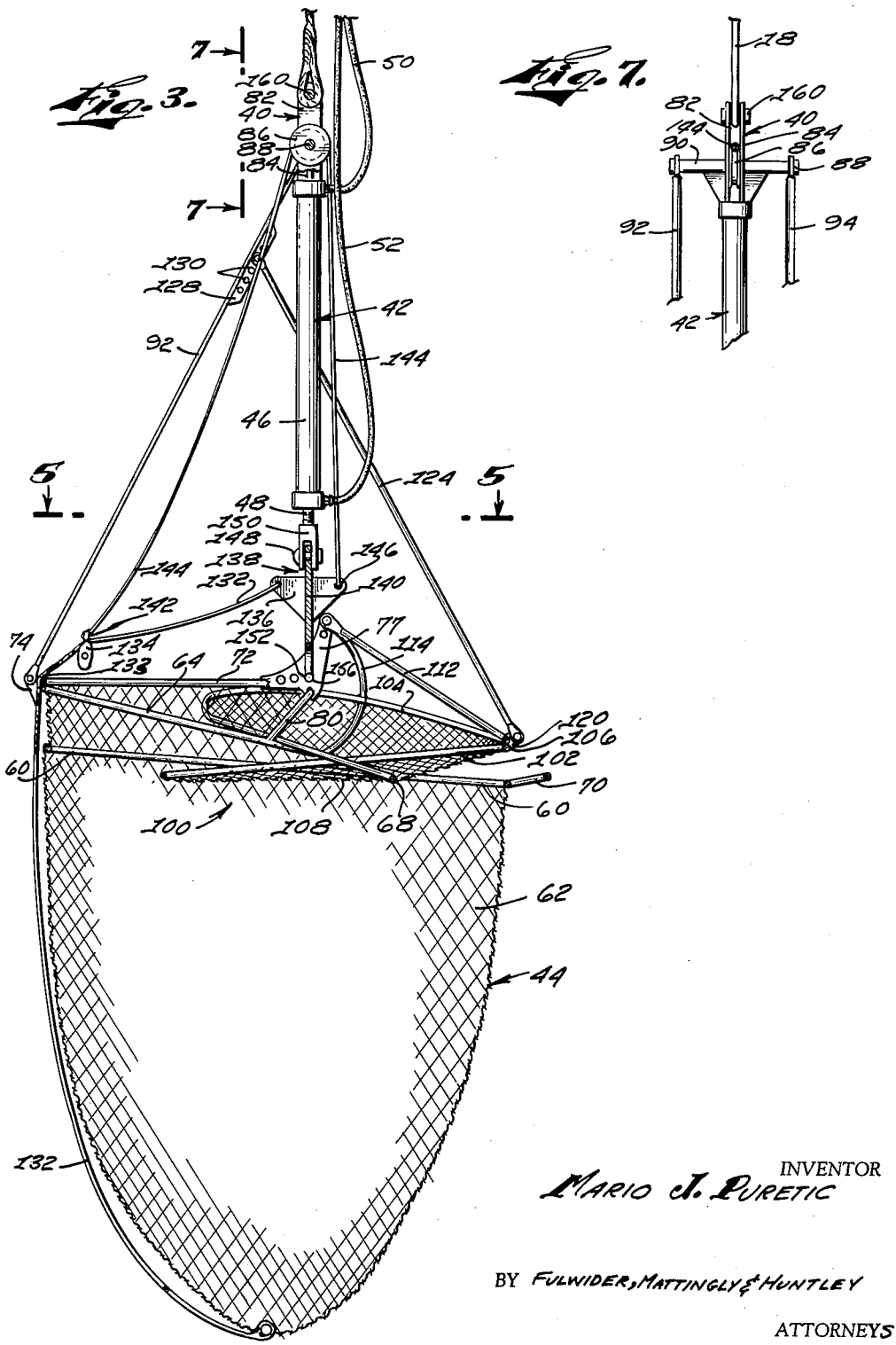

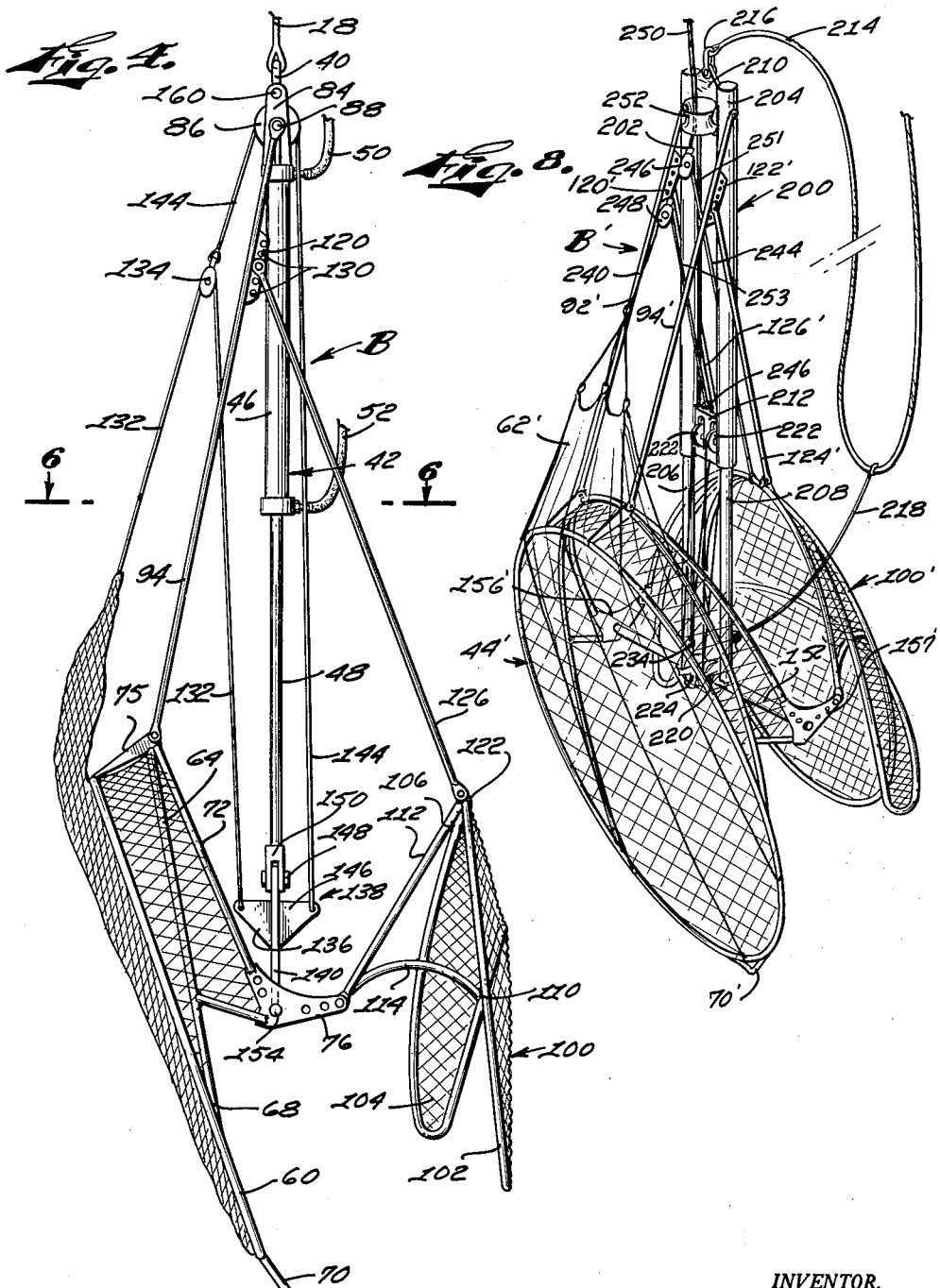

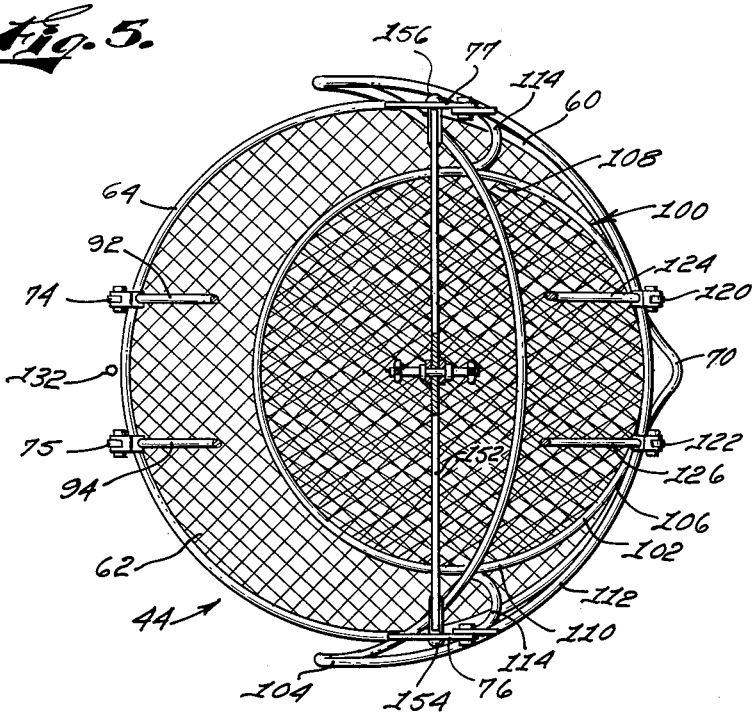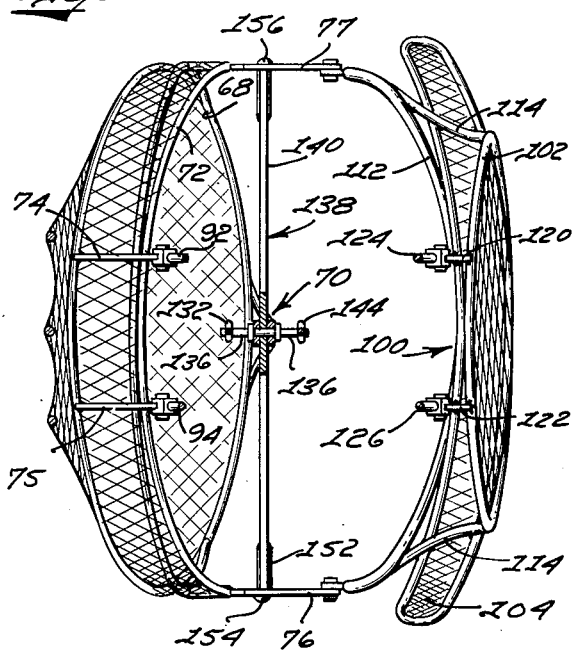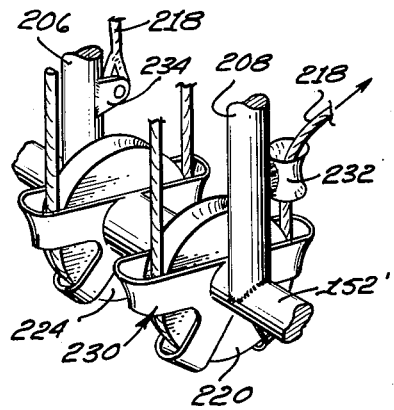

United States Patent Office 3,058,247
Patented Oct. 16, 1962

3,058,247
BRAILER APPARATUS
Mario J. Puretic, 30514 Avenida Corona,
San Pedro, Calif.
Filed Sept. 19, 1960, Ser. No. 56,846
28 Claims. (Cl. 43—6.5)

The present invention relates generally to the art of fishing and more particularly to novel brailer apparatus for recovering fish from a seine and transferring such fish to a fishing boat.

Fishing is one of the oldest arts and comparatively little has been done over the years to change apparatus and methods that have been followed in the fishing art for centuries. A fundamental and novel advance in the art of fishing is disclosed in my United States Letters Patent Nos. 2,733,530 and 2,733,531, issued February 7, 1956. These patents disclose an apparatus and method for drawing a seine net alongside a fishing boat by means of a power-driven block suspended from a boom on the boat. The use of such power-driven block has greatly expedited the hauling-in of the seine net alongside the boat, and it has been possible in many cases to substantially reduce the number of men required for a commercial fishing boat crew. Although the use of such power-driven blocks permits the netted fish to be brought alongside the fishing boat in a minimum period of time, there still remains the difficult problem of recovering the fish from the seine and transferring such fish into the hold or holds of the fishing boat.

Presently, it is conventional to scoop the fish from the seine by means of a shallow, basket-like device, generally termed a brailer. This brailer generally comprises a rigid hoop approximately five or six feet in diameter from which depends an open-topped bag-like net. The hoop is attached to a long handle. This handle is manipulated by two or three men positioned in a large skiff alongside the fishing boat. These men manually urge the hoop into the mass of heavy fish within the seine. Thereafter, the hoop is hoisted towards the fishing boat by means of a line attached thereto and extending to the fishing boat's deck. During this operation the skiff is usually pitching heavily in the sea. Thus, the brailing operation is a dangerous job requiring great experience and tremendous strength. Moreover, this operation is time consuming.

It is a major object of the present invention to provide novel brailer apparatus for rapidly transferring netted fish onto a fishing boat.

In general, the brailer apparatus of the present invention includes a basket member that is movable between an open position and a closed position. This basket member is supported from a lifting device disposed upon a fishing boat. After a fish-containing seine net has been brought alongside the fishing boat, the basket is lowered into the netted fish in an open position. Thereafter, the basket is closed so as to trap or grab a portion of the netted fish. Next, the closed basket and its load of fish is raised by the lifting device and swung over the fish-receiving hold of the boat. Finally, the basket is opened so as to discharge its load into the fish-receiving hold.

It is an object of the present invention to provide brailer apparatus of the aforedescribed nature which is power operated and permits the brailer operation to be conducted with a minimum expenditure of labor.

Another object of the present invention is to provide brailer apparatus of the aforedescribed nature that permits the brailing operation to be accomplished in a minimum amount of time. This time having is extremely important since when a fish school is sighted it is highly desirable to quickly run the seine net, capture the fish and transfer them rapidly to the hold of the fishing boat in order that the school may be quickly followed and more fish captured.

Another object of the present invention is to provide brailer apparatus of the aforedescribed nature which is fool-proof in operation, simple of design and rugged of construction whereby it may provide a long and trouble-free service life.

An additional object of the present invention is to provide brailer apparatus for transferring netted fish onto a fishing boat by means of a lifting device carried by the fishing boat that includes attachment means connectible to the lifting device, a vertically extending longitudinally collapsible actuating member depending from the attachment means, a basket member operatively connected to the actuating member for movement between an open position and a closed position as the actuating member is longitudinally collapsed, and means operatively connected to the fishing boat for effecting longitudinal collapse of the actuating member in order that the basket member may be lowered into the netted fish in an open position and thereafter closed so as to trap a portion of the netted fish, with the closed basket thereafter being raised by the lifting device onto the boat and the basket then being opened to discharge the load of fish therein onto the boat.

These and other objects and advantages of the present invention will become apparent from the following detailed description when taken in conjunction with the appended drawings wherein:

FIGURE 3 is a side elevational view in further enlarged scale showing said brailer apparatus with the basket member thereof in a closed position;

FIGURE 4 is a view similar to FIGURE 3 but showing said basket member in a partially open position;

FIGURE 5 is a horizontal sectional view taken on line 5—5 of FIGURE 3;

FIGURE 6 is a horizontal sectional view taken on line 6—6 of FIGURE 4;

FIGURE 7 is a fragmentary vertical sectional view taken along the line 7—7 of FIGURE 3;

FIGURE 8 is a perspective view showing a second form of brailer apparatus embodying the present invention; and FIGURE 9 is a fragmentary perspective view of a detail of FIGURE 8.

Figure 1:
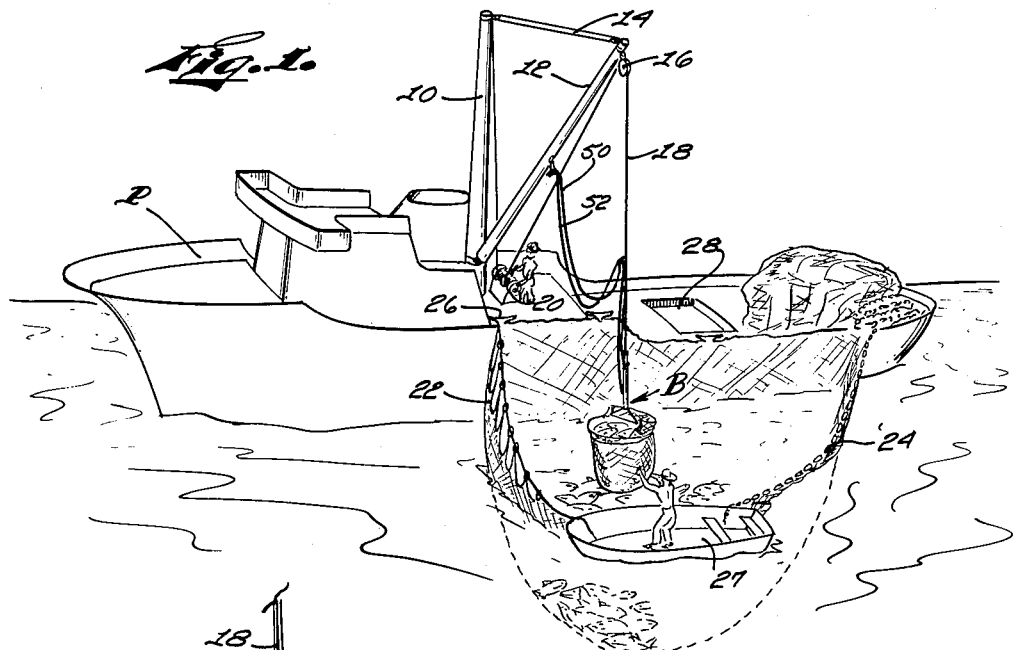
FIGURE 1 is a perspective view showing a preferred form of brailer apparatus embodying the present invention in the step of raising a load of fish out of a pursed seine net.

Referring to the drawings and particularly FIGURE 1 thereof, the preferred form of brailer apparatus B embodying the present invention is shown in conjunction with a conventional purse seine fishing boat P. The boat P is provided with a mast 10 and a boom 12 of conventional construction. The boom 12 is pivotally connected to the lower portion of the mast 10 and is adapted to be positioned at the desired angle relative to the mast by conventional rigging 14. Suspended from the free end of the boom 12 is a conventional winch or block 16. The latter serves to guide a lifting line 18 that extends to a conventional power-operated winch 20 positioned on the boat P adjacent the mast 10. The end of the lifting line 18 opposite the winch 20 is affixed to the upper end of brailer apparatus B.

A conventional purse seine net 22 is shown disposed alongside the fishing boat P, with the upper end of the net being supported by a float line 24. The construction and operation of such purse net 22 is well known. In FIGURE 1 the purse net 22 has been closed about a group of fish and is shown snubbed to cleats 26 secured to the deck of the fishing boat P. A portion of the net 22 has been drawn onto the rear of the boat P. A skiff 27 is shown positioned alongside one portion of the net 22 and may provide some support therefor. The brailer apparatus B is operated in a manner fully described hereinafter to transfer the fish netted within the pursed seine net 22 from the confines of the net to one or more fish-receiving holds 28 formed in the hull of the fishing boat P.

The preferred form of brailer apparatus B embodying the present invention includes attachment means such as a hanger, generally designated 40, that is attached to the end of the aforementtioned lifting line 18 remoted from the power winch 20. The hanger 40 is disposed at the upper end of a vertically extending, longitudinally collapsible actuating member, generally designated 42. A basket member, generally designated 44, is operatively connected to the actuating member 42. This basket member 44 is movable between a closed position shown in FIGURES 3 and 5 and an open position shown in FIGURES 2, 4 and 6. The basket member 44 is so connected to the actuating member 42 as to be movable between its open position to its closed position upon longitudinal movement of the actuating member 42, as will be apparent by a comparison of FIGURES 3 and 4. The actuating member 42 of the preferred form of the present invention includes a vertical cylinder 46 wherein is longitudinally slidably disposed a plunger 48. Vertical reciprocation of the plunger 48 relative to the cylinder 46 is effected by fluid pressure in a conventional manner, with pressurized fluid being transmitted to and from the upper and lower ends of the cylinder 46 by means of flexible conduits 50 and 52, respectively. The ends of these fluid conduits remote from the cylinder 46 are connected to a suitable conventional source of fluid pressure (not shown) disposed upon the fishing boat P. This source may be either a hydraulic pressure or air pressure providing device.

Referring particularly to FIGURE 3, the basket member B includes a rigid, horizontal metallic hoop 60 from which depends an open-topped bag-like net 62. A partial hoop element 64 is disposed vertically above the loop element 60 and is inclined upwardly and rearwardly away from the front portion of the hoop 60, with its lower ends being rigidly affixed to the front portion of the hoop 60, as by welding, at the point 68. The front end of the hoop 60 is integrally formed with a forwardly projecting guide finger 70. A horizontal half hoop 72 extends forwardly from its point of interconnection with the rear end of the partial hoop 64 and in vertical alignment with hoop 60. The half hoop 72 is of metallic construction and is rigidly affixed to the rear end of the partial hoop 64 as by welding. A pair of vertically extending struts 74 and 75 rigidly interconnect the rear portions of the hoop elements 60, 64 and 72.

With continued reference to FIGURE 3, the front ends of the half hoops 72 are rigidly affixed as by welding to a pair of crank arms 76 and 77 of generally reversed L shape. A short downwardly and rearwardly inclined brace 80 interconnects the midportion of the crank arms 76 and 77 to the front portion of the partial hoops 64.

The upper end of the hydraulic cylinder 46 is secured to the hanger 40. This hanger includes vertical bifurcations 82 and 84 between which is rotatably supported a pulley 86 by means of a horizontally extending pivot pin 88. The pivot pin 88 extends through a horizontal tube 90 that projects outwardly from either side of the bifurcations 82 and 84 an equal distance, as shown in FIGURE 7. With continued reference to FIGURE 7, it will be noted that the outer ends of the tube 90 are pivotally attached to the upper ends of a pair of basket tilting rods 92 and 94. The lower ends of these tilting rods are pivotally connected to the upper ends of the afore-described struts 74 and 75 of the basket member 44. With this arrangement, downward movement of the hydraulic plunger 48 relative to its retracted position of FIGURE 3 will effect the pivotal movement of the basket member 44 in a clockwise direction relative to its closed position of FIGURE 3 to its open position of FIGURE 4.

The basket member 44 is provided with a scoop member, generally designated 100. The scoop member 100 is positioned adjacent the upper portion of the basket member 44. It is so interconnected with the actuating member 42 as to be movable between its generally horizontally disposed position over the basket member 44 shown in FIGURE 3 and a generally vertically extending position disposed forwardly of the basket member when the latter is arranged in its open position of FIGURE 4.

Referring to FIGURE 3, the scoop member 100 includes a rigid hoop element 102 that extends generally downwardly and rearwardly relative to the upper portion of the basket member 44 when the latter is in its closed position of this figure. A generally semi-annular fish deflecting element 104 extends upwardly and rearwardly relative to the midportion of the hoop element 102. This fish deflecting element 104 is defined by looped rigid metallic rod and is rigidly affixed to the hoop element 102 as by welding at the rear portion thereof, as indicated at 106. The intermediate portion of this looped metallic rod is welded to the intermediate portions of the hoop 102, as indicated at 108 and 110 in FIGURE 5. The rear end of the hoop element 102 is also rigidly affixed as by welding at 106 to an upwardly and rearwardly extending half loop 112, as indicated in FIGURE 3. A curved connecting link 114 extends from the upper ends of the half hoop 112 downwardly to the intermediate portions of the hoop element 102. The link 114 intersects the intermediate portion of the deflecting element 104 and is rigidly affixed thereto as by welding at the points of interconnection therewith.

The opposite ends of the half hoop 112 are pivotally connected to the upper ends of the aforedescribed crank arms 76 and 77. The rear ends of the hoops 102, 104 and 112 are rigidly affixed to a pair of ears 120 and 122. These ears 120 and 122 pivotally receive the lower end of a pair of scoop tilting rods 124 and 126. The upper ends of these rods 124 and 126 are pivotally connected to the upper portion of the aforedescribed basket tilting rods 92 and 94. Preferably, the upper portion of the rods 92 and 94 are each formed with straps 128 having a plurality of bores 130. With this arrangement, the position of the upper ends of the scoop tilting rods relative to the basket tilting rods may be adjusted. The aforedescribed arrangement permits the scoop 100 to be pivoted counterclockwise from its position of FIGURE 3 to its position of FIGURE 4 as the hydraulic plunger 48 undergoes downward movement relative to the hydraulic cylinder 46.

The lower end of the net 62 of the basket member 44 is affixed to an upwardly extending, flexible dump line 132. This dump line 132 is adapted to pull the lower portion of the net 62 upwardly to its position of FIGURE 4 as the basket member is pivoted from its closed position of FIGURE 3 to its open position of FIGURE 4. This serves to dump any fish trapped in the net 62 out of the net and onto the fishing boat. As shown in FIGURE 3, the dump line 132 extends upwardly alongside the net 62 through a guide 133 on the basket and then through a pulley 134. The end of the dump line 132 opposite the net 62 is affixed to an ear 136 formed on pusher member, generally designated 138, carried by the lower end of the hydraulic plunger 48.

The pusher member 138 includes a vertical plate 140 to which the ear 136 is rigidly affixed as by welding.

The pulley 134 is supported by means of a loop 142 that is affixed to the lower end of a tensioning line 144. The tensioning line 144 extends upwardly through the aforementioned pulley 86 and thence downwardly alongside the actuating member 42 to an ear 146 formed on the side of the plate 140 opposite the aforementioned ear 136. With this arrangement, the tensioning line 144 and the dump line 132 will be tightened upon downward movement of the hydraulic plunger 48 relative to the hydraulic cylinder 46 so as to lift the basket net 62 into its fish dumping position of FIGURE 4.

The upper end of the plate 140 of the pusher member 138 receives a horizontal pin 148. The latter serves to connect the plate 140 to a clevis 150 that is affixed to the lower end of the hydraulic plunger 48. The lower end of the plate 140 is rigidly secured as by welding to a horizontal pivot rod 152. The outer ends of the pivot rod 152 pivotally support the aforedescribed crank arms 76 and 77 by means of pins 154 and 156.

In the operation of the aforedescribed apparatus, the net 22 is first pursed about a group of fish and thereafter brought alongside the fishing boat P, as indicated in FIGURE 1. Thereafter, the boom 12 is manipulated so as to be in substantial vertical alignment with the portion of the seine 22 from where it is desired to withdraw netted fish. The hanger 40 of the brailer apparatus B is then affixed to the lifting line 18 as by means of a horizontal pin 160 shown particularly in FIGURES 3 and 7.

Figure 2:
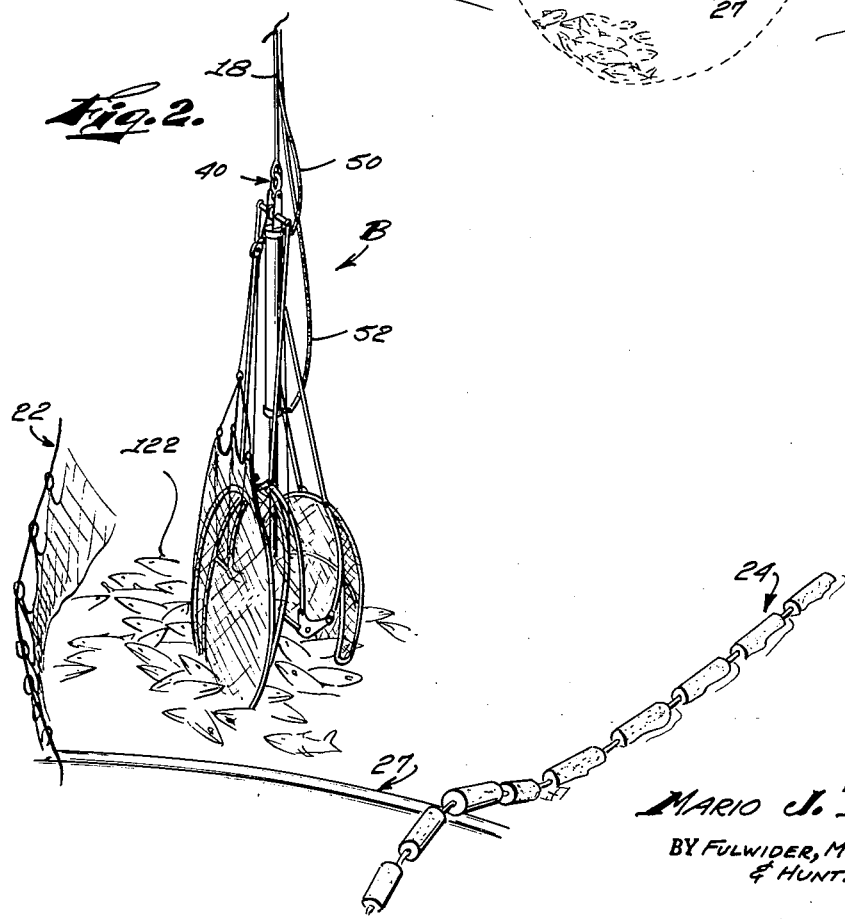
FIGURE 2 is a perspective view in enlarged scale relative to FIGURE 1 showing said brailer apparatus being lowered into said net so as to trap a portion of the netted fish.

The hydraulic plunger 48 is then caused to be extended downwardly from its fluid cylinder 46 so as to position the basket member 44 in its generally vertically extending position of FIGURE 4. The scoop member 100 is likewise caused to assume its generally vertically extending position of this figure. The lifting line 18 is then operated so as to lower the brailing apparatus B into the netted fish 122, as indicated in FIGURE 2. If desired, a man may be positioned in the skiff 24 to steady the brailer apparatus B as it is so lowered. With the brailer apparatus so positioned the hydraulic plunger 48 is retracted upwardly within its cylinder 46 so as to move the basket member 44 to its closed position of FIGURE 3. Concurrently, the scoop member 100 will be pivoted to its position of this figure. Since the pivotal movement of the basket and scoop members towards their position of FIGURE 3 is concurrent, the scoop member 100 serves to urge fish into the confines of the basket net 62 as the basket is undergoing pivotal movement towards its closed position. During such pivotal movement of the scoop member its fish deflecting member 104 serves to urge the netted fish radially inwardly towards the basket member 44. It should also be noted that as the basket member is lowered toward the netted fish its guide element 70 directs the front portion of the hoop 60 underneath the netted fish. With the aforedescribed arrangement a maximum number of fish may be taken during each trip made by the basket member. When the basket member has assumed its closed position, the scoop member 100 will serve to positively trap the fish within the confines of the basket net 62.

The loaded brailer apparatus B will be lifted out of the water by the lifting line 18 in the manner indicated in FIGURE 1. Next, the boom 12 will be swung horizontally so as to position the brailer apparatus B over one of the fish-receiving holds 28 of the boat P. The hydraulic plunger 48 is then again extended downwardly relative to its cylinder 46. This serves to pivot the basket and scoop members to their positions of FIGURE 4. As the basket member 44 is being pivoted to its open position, the dump line 132 is concurrently tightened so as to cause the basket net 62 to be raised into its position of FIGURE 4. This serves to dump the fish within the basket net 62 out of this net and into the fish-receiving hold 28. Finally, the boom 12 is returned to its original position and the operation is repeated.

Referring now to FIGURE 8, there is shown a second form of brailer apparatus B' embodying the present invention. This second form of brailer apparatus includes certain parts which correspond to the parts of the aforedescribed form of brailer apparatus B. Such similar parts bear primed reference numerals. Thus, the second form of brailer apparatus B' includes a basket member 44' and a scoop member 100', with such members being affixed to a horizontally extending pivot rod 152' the ends of which are connected to a pair of crank arms 156' and 157'.

The second form of brailer apparatus B' is provided with an actuating member, generally designated 200, which differs from the actuating member 42 of the aforedescribed form of brailer apparatus B. The actuating member 200 includes a pair of aligned, hollow cylinders 202 and 204 wherein are vertically slidably disposed a pair of plungers 206 and 208, respectively. The upper ends of the cylinders 202 and 204 are rigidly interconnected by a vertically extending lifting plate 210 while the lower ends thereof are rigidly affixed to a lower pulley plate 212. A main haul line 214 is secured to the upper end of the lifting plate 210 as by a clevis 216. The bight of this main haul line 214 is affixed to a plunger collapsing line 218. The plunger collapsing line 218 extends downwardly away from the bight of the main haul line 214 over a first pulley 220 supported on the pivot rod 152' inwardly of one of the plungers 208. From the pulley 220 the plunger collapsing line 218 extends upwardly through a pulley 222 that is carried by the aforementioned lifting plate 210. The plunger collapsing line then extends downwardly through a second pulley 224 supported by the pivot rod 152' adjacent the first-mentioned pulley 220. The plunger collapsing line 218 then extends upwardly through a second pulley 226 supported by the aforementioned lifting plate 210. With this arrangement upward tightening of the main haul line 214 effects concurrent upward tightening of line 218 so as to effect upward movement of the plungers 206 and 208 within the cylinders 202 and 204. This movement will serve to pivot the basket and scoop members 44' and 100', respectively, from their open position of FIGURE 8 toward a closed position generally corresponding to the position of these members in FIGURE 3.

As indicated in FIGURE 9, the plunger collapsing line 218 is guided through the pulleys 220 and 224 by means of suitable guide loops 230 and an eye 232. The end of the collapsing line 218 opposite the main haul line 214 is suitably affixed to the lower portion of the plunger 206, as indicated at 234.

The lower portion of the net 62' of the basket 44' is provided with a dump line 240. The opposite end of the dump line 240 is affixed to a loop 242 formed on the upper end of the lower lifting plate 212. The upper outer portion of the scoop 100' is provided with a tilting line 244. The upper portion of this tilting line 244 passes through a block 246 and then downwardly. At its lower end remote from the scoop member 100 the tilting line 244 is attached to a pulley 248. The bight of the basket dump line 240 passes through this block 248. The block 246 is supported by a dump opening line 250. This dump opening line 250 passes through a guide eye 252 that is affixed to one side of the lifting plate 210.

The basket member 44' is provided with a pair of upwardly extending tilting rods 92' and 94'. The upper ends of these tilting rods are pivotally affixed to the upper portion of the cylinders 202 and 204. Similarly, the scoop member 100' is provided with a pair of upwardly extending tilting rods 124' and 126'. The upper ends of the scoop tilting rods 124' and 126' are pivotally connected to a pair of ears 120' and 122' affixed to the upper portion of the basket tilting rods 92' and 94' in a manner similar to that described hereinbefore with respect to the first form of brailer apparatus B.

In the operation of the second form of brailer apparatus B' the main haul line 214 is slackened. Concurrently, the dump line 250 is tightened as by means of a boom and winch arrangement such as described in conjunction with the first form of brailer apparatus B. The weight of the brailer apparatus B' will then be supported by the dump line 250. Tightening of the dump line 250 also serves to exert upward force on the bight 251 of the scoop tilting line 244 as well as the bight 253 of the dump line 240. The plungers 206 and 208 with their attached basket and scoop members will be therefore disposed in their lowered position relative to the cylinders 202 and 204 as indicated in FIGURE 8, and the basket and scoop members 44' and 100', respectively, will be arranged in their generally vertically extending open position of this figure.

With the basket and scoop members disposed in their position of FIGURE 8 the brailer apparatus B' may be lowered into a pursed seine net. Thereafter, the dump line 250 will be slackened and the main haul line 214 tightened upwardly. The weight of the brailer apparatus B' will then be transferred to the main haul line 214. Upward movement of the main haul line 214 will serve to tighten the plunger collapsing line 218 in the direction shown by the arrow in FIGURE 9. Such tightening of the plunger collapsing line 218 will serve to urge the pivot rod 152' and its attached elements upwardly. As the pivot rod 152' and its attached elements move upwardly relative to the cylinders 202 and 204, the basket member 44' will be caused to pivot counterclockwise relative to its position of FIGURE 8 towards a closed position. Similarly, the scoop member 100 will be caused to pivot clockwise towards the basket member. As the plungers 206 and 208 reach the upper limit of their movement, the basket and scoop members will be arranged in a position corresponding to the position of the basket and scoop members 44 and 100, respectively, of the brailer apparatus B in FIGURE 3. During the pivotal movement of the basket and scoop members towards a closed position, a portion of the fish contained within the pursed seine net will be trapped within the basket 44'.

The closed basket member and its load of fish will be lifted out of the water by means of the main haul line 214 and disposed over a fish-receiving hold of the fishing boat (not shown). The dump line 250 will then be tightened while the main haul line 214 is concurrently slackened. The weight of the brailer apparatus B' and the fish therein will again be transferred to the dump line 50. The plungers 206 and 208 and their attached parts will accordingly then be free to move downwardly and the basket member 44' will pivot in a clockwise direction to its open position of FIGURE 8. Similarly, the scoop member 100' will pivot in a counterclockwise direction to its position of this figure. The tightening of the dump line 250 will also serve to lift the net 62' of the basket member 44' into its fish dumping position of FIGURE 8. This serves to dump the fish within the basket net 62' out of the net and into the fish-receiving hold of the boat. The brailer apparatus B' may then be returned to a position over the pursed seine net for receiving another load of fish.

It will be apparent that various modifications and changes may be made with respect to the foregoing description without departing from the spirit of the present invention or the scope of the following claims.

I claim:

1. Brailer apparatus for transferring netted fish onto a fishing boat comprising: a lifting device carried by said boat; attachment means connectible to said lifting device; an actuating member depending from said attachment means; basket means operatively connected to said actuating member for movement between an open position and a closed position; and means operatively connected to said boat for effecting operation of said actuating member whereby said basket means may be lowered into said netted fish in an open position and thereafter urged into a closed position to trap a portion of said netted fish, with said closed basket means thereafter being raised by said lifting device onto said boat and then urged into an open position to discharge said portion of fish onto said boat.

2. Apparatus as set forth in claim 1 wherein said actuating means includes vertically extending cylinder and plunger means.

3. Apparatus as set forth in claim 2 wherein said cylinder and plunger means includes a vertical cylinder and a slidable plunger disposed therein, with the interior of said cylinder adapted to be connected to fluid pressure transmitting-conduit means.

4. Brailer apparatus for transferring netted fish onto a fishing boat comprising: a lifting device carried by said boat; attachment means connectible to said lifting device; a vertically extending longitudinally collapsible actuating member depending from said attachment means; basket means operatively connected to said actuating member for movement between a closed position, and an open position, said basket means being urged between said positions as said actuating member is longitudinally collapsed; and means operatively connected to said boat for effecting longitudinal collapse of said actuating member whereby said basket means may be lowered into said netted fish in an open position and thereafter urged into a closed position to trap a portion of said netted fish, with said closed basket means thereafter being raised by said lifting device onto said boat and then urged into an open position to discharge said portion of fish onto said boat.

5. Apparatus as set forth in claim 4 wherein said actuating means includes vertically extending cylinder and plunger means.

6. Apparatus as set forth in claim 5 wherein said cylinder and plunger means includes a vertical cylinder and a slidable plunger disposed therein, with the interior of said cylinder adapted to be connected to fluid pressure transmitting-conduit means.

7. Brailer apparatus for transferring netted fish onto a fishing boat comprising: a lifting device carried by said boat; attachment means connectible to said lifting device; an actuating member depending from said attachment means; a basket member operatively connected to said actuating member for movement between an open position and a closed position; a scoop member operatively connected to said actuating member adjacent the upper portion of said basket member; and means operatively connected to said boat for effecting operation of said actuating member whereby said basket and scoop members may be lowered into said netted fish with said basket member in an open position and said scoop member positioned to one side thereof, said actuating member then urging said basket member to a closed position while said scoop member is concurrently moved towards the upper portion of said basket member to trap a portion of said netted fish, with said closed basket member thereafter being raised by said lifting device onto said boat and then urged into an open position to discharge said portion of fish onto said boat.

8. Apparatus as set forth in claim 7 wherein said actuating means includes vertically extending cylinder and plunger means.

9. Apparatus as set forth in claim 8 wherein said cylinder and plunger means includes a vertical cylinder and a slidable plunger disposed therein, with the interior of said cylinder adapted to be connected to fluid pressure transmitting-conduit means.

10. Brailer apparatus for transferring netted fish onto a fishing boat comprising: a lifting device carried by said boat; attachment means connectible to said lifting device; a vertically extending longitudinally collapsible actuating member depending from said attachment means; a basket member operatively connected to said actuating member for movement between a closed position and an open position, said basket member being urged between said positions as said actuating member is longitudinally collapsed; a scoop member operatively connected to said actuating member adjacent the upper portion of said basket member; and means operatively connected to said boat for effecting operation of said actuating member whereby said basket and scoop members may be lowered into said netted fish with said basket member in an open position and said scoop member positioned to one side thereof, said actuating member then urging said basket member to a closed position while said scoop member is concurrently moved towards the upper portion of said basket to trap a portion of said netted fish, with said closed basket member thereafter being raised by said lifting device onto said boat and then urged into an open position to discharge said portion of fish onto said boat.

11. Apparatus as set forth in claim 10 wherein said actuating means includes vertically extending cylinder and plunger means.

12. Apparatus as set forth in claim 11 wherein said cylinder and plunger means includes a vertical cylinder and a slidable plunger disposed therein, with the interior of said cylinder adapted to be connected to fluid pressure transmitting-conduit means.

13. Brailer apparatus for transferring netted fish onto a fishing boat comprising: a lifting device carried by said boat; attachment means connectible to said lifting device; an actuating member depending from said attachment means; a basket member operatively connected to said actuating member for movement between an open position and a closed position; a dump line interconnecting said basket and said actuating member; a dump line tensioning line interposed between said dump line and said actuating member to tighten said dump line when said basket means is urged to said open position; and means operatively connected to said boat for effecting longitudinal collapse of said actuating member whereby said basket member may be lowered into said netted fish in an open position and thereafter urged into a closed position to trap a portion of said netted fish with said closed basket member thereafter being raised by said lifting device onto said boat and then urged into an open position, said dump line being automatically tightened as said basket member is opened whereby said portion of fish is dumped onto said boat.

14. Apparatus as set forth in claim 13 wherein said actuating means includes vertically extending cylinder and plunger means.

15. Apparatus as set forth in claim 14 wherein said cylinder and plunger means includes a vertical cylinder and a slidable plunger disposed therein, with the interior of said cylinder adapted to be connected to fluid pressure transmitting-conduit means.

16. Brailer apparatus for transferring netted fish onto a fishing boat comprising: a lifting device carried by said boat; attachment means connectible to said lifting device; a vertically extending longitudinally collapsible actuating member depending from said attachment means; basket means operatively connected to said actuating member for movement between a closed position and an open position, said basket means including a fish-receiving net, and said basket means being urged between said positions as said actuating member is longitudinally collapsed; a dump line interconnecting the fish-receiving net of said basket means and said actuating member; a dump line tensioning line interposed between said dump line and said actuating member to tighten said dump line when said basket means is urged to said open position; and means operatively connected to said boat for effecting longitudinal collapse of said actuating member whereby said basket means may be lowered into said netted fish in an open position and thereafter urged into a closed position to trap a portion of said netted fish with said closed basket means thereafter being raised by said lifting device onto said boat and then urged into an open position, said dump line being automatically tightened as said basket means is opened whereby said portion of fish is dumped onto said boat.

17. Apparatus as set forth in claim 16 wherein said actuating means includes vertically extending cylinder and plunger means.

18. Apparatus as set forth in claim 17 wherein said cylinder and plunger means includes a vertical cylinder and a slidable plunger disposed therein, with the interior of said cylinder adapted to be connected to fluid pressure transmitting-conduit means.

19. Brailer apparatus for transferring netted fish onto a fishing boat comprising: a lifting device carried by said boat; attachment means connectible to said lifting device; an actuating member depending from said attachment means; basket means operatively connected to said actuating member for movement between a closed position and an open position, said basket means including a fish-receiving net, and said basket means being urged between said positions by said actuating member; scoop means operatively connected to said actuating member adjacent the upper portion of said basket means; a dump line interconnecting the fish-receiving net of said basket means and said actuating member; a dump line tensioning line interposed between said dump line and said actuating member to tighten said dump line when said basket means is urged to said open position; and means operatively connected to said boat for effecting operation of said actuating member whereby said basket and scoop means may be lowered into said netted fish with said basket means in an open position and said scoop means disposed to one side thereof, said actuating member then urging said basket means to a closed position while said scoop means is concurrently moved towards the upper portion of said basket means to trap a portion of said netted fish, with said closed basket means thereafter being raised by said lifting device onto said boat and then urged into an open position, said dump line being automatically tightened as said basket means is opened whereby said portion of fish is dumped onto said boat.

20. Apparatus as set forth in claim 19 wherein said actuating means includes vertically extending cylinder and plunger means.

21. Apparatus as set forth in claim 20 wherein said cylinder and plunger means includes a vertical cylinder and a slidable plunger disposed therein, with the interior of said cylinder adapted to be connected to fluid pressure transmitting-conduit means.

22. Brailer apparatus for transferring netted fish onto a fishing boat comprising: a lifting device carried by said boat, attachment means connected to said lifting device; an actuating member depending from said attachment means, said actuating member including cylinder means having vertically slidably plunger means disposed therein; basket means operatively connected to said actuating member for movement between an open and closed position as said plunger means is retracted vertically within said cylinder means; and means operatively connected to said boat for effecting longitudinal retraction of said plunger means within said cylinder means whereby said basket means may be lowered into said netted fish in an open position and thereafter urged into a closed position to trap a portion of said netted fish, with said closed basket means thereafter being raised by said lifting device onto said boat and then urged into an open position to discharge said portion of fish onto said boat.

23. Apparatus as set forth in claim 22 wherein said means operatively connected to said boat includes a main haul line secured to the upper portion of said cylinder means, a collapsing line affixed to one end to the bight of said main haul line, and pulley means carried by said cylinder means and said plunger means, with said collapsing means running through said pulley means.

24. Brailer apparatus for transferring netted fish onto a fishing boat comprising: a lifting device carried by said boat; attachment means connected to said lifting device; an actuating member depending from said attachment means, said actuating member including cylinder means having vertically slidably plunger means disposed therein; basket means operatively connected to said actuating member for movement between an open and closed position as said plunger means is retracted vertically within said cylinder means; scoop means operatively connected to said actuating member adjacent the upper portion of said basket means; and means operatively connected to said boat for effecting longitudinally retraction of said plunger means within said cylinder means whereby said basket and scoop means may be lowered into said netted fish with said basket means in an open position and said scoop means disposed to one side thereof, with the retraction of said plunger means within said cylinder means urging said basket means to a closed position while said scoop means is concurrently moved towards the upper position of said basket means to trap a portion of said netted fish, said closed basket means thereafter being raised by said lifting device onto said boat and said plunger means extended from within said cylinder means to move said basket means into an open position for discharging said portion of fish onto said boat.

25. Apparatus as set forth in claim 24 wherein said means operatively connected to said boat includes a main haul line secured to the upper portion of said cylinder means, a collapsing line affixed at one end to the bight of said main haul line, and pulley means carried by said cylinder means and said plunger means, with said collapsing means running through said pulley means.

26. Brailer apparatus for transferring netted fish onto a fishing boat comprising: a lifting device carried by said boat; attachment means connectible to said lifting device; an actuating member depending from said attachment means; basket means operatively connected to said actuating member for movement between an open position and a closed position; and means operatively connected to said boat for effecting operation of said actuating member whereby said basket means may be lowered into said netted fish in an open position and thereafter urged into a closed position to trap a portion of said netted fish, with said closed basket means thereafter being moved by said lifting device into a fish discharging location over said boat.

27. Apparatus as set forth in claim 26 wherein said actuating means includes vertically extending cylinder and plunger means.

28. Apparatus as set forth in claim 27 wherein said cylinder and plunger means includes a vertical cylinder and a slidable plunger disposed therein, with the interior of said cylinder adapted to be connected to fluid pressure transmitting-conduit means.

References Cited in the file of this patent

UNITED STATES PATENTS

| | | |
|---|---|---|
| 523,807 | Chaquette | July 31, 1894 |
| 1,327,324 | Hecker | Jan. 6, 1920 |

FOREIGN PATENTS

| | | |
|---|---|---|
| 13,577 | Germany | July 12, 1956 |